US010812855B2

(12) United States Patent
Kwatra et al.

(10) Patent No.: US 10,812,855 B2
(45) Date of Patent: Oct. 20, 2020

(54) DYNAMIC MODIFICATION OF MEDIA CONTENT IN AN INTERNET OF THINGS (IOT) COMPUTING ENVIRONMENT

(71) Applicant: INTERNATIONAL BUSINESS MACHINES CORPORATION, Armonk, NY (US)

(72) Inventors: Shikhar Kwatra, Durham, NC (US); Jeremy R. Fox, Georgetown, TX (US); Maharaj Mukherjee, Poughkeepsie, NY (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/122,724

(22) Filed: Sep. 5, 2018

(65) Prior Publication Data

US 2020/0077136 A1 Mar. 5, 2020

(51) Int. Cl.
*H04N 21/431* (2011.01)
*H04N 21/442* (2011.01)
*H04W 4/70* (2018.01)
*H04L 29/06* (2006.01)
*G06N 20/00* (2019.01)

(52) U.S. Cl.
CPC ......... *H04N 21/4316* (2013.01); *G06N 20/00* (2019.01); *H04L 65/4084* (2013.01); *H04N 21/44222* (2013.01); *H04W 4/70* (2018.02)

(58) Field of Classification Search
None
See application file for complete search history.

(56) References Cited

U.S. PATENT DOCUMENTS

| | | | |
|---|---|---|---|
| 8,138,930 B1* | 3/2012 | Heath | G01W 1/00 340/540 |
| 8,910,201 B1* | 12/2014 | Zamiska | H04N 21/44222 725/34 |
| 9,288,531 B2 | 3/2016 | Woods et al. | |
| 10,057,640 B2* | 8/2018 | Oshima | H04L 65/4084 |
| 2003/0028873 A1* | 2/2003 | Lemmons | H04N 7/17318 725/36 |
| 2005/0203349 A1* | 9/2005 | Nanikashvili | A61B 5/0002 600/300 |
| 2007/0226761 A1* | 9/2007 | Zalewski | G06Q 30/02 725/32 |
| 2008/0046920 A1* | 2/2008 | Bill | H04N 21/222 725/34 |
| 2009/0210898 A1* | 8/2009 | Childress | H04H 60/46 725/34 |
| 2010/0100826 A1* | 4/2010 | Hawthorne | G06Q 30/02 715/745 |

(Continued)

*Primary Examiner* — Alexander Q Huerta
(74) *Attorney, Agent, or Firm* — Griffiths & Seaton PLLC (57) ABSTRACT

Embodiments for optimizing media content in an Internet of Things (IoT) environment. User information is collected by a first, embedded IoT computing device associated with a user. The collected user information is transmitted from the first computing device to a second, content-displaying IoT computing device. Characteristics of media content rendered by the second computing device are then rendered according to an analyzation of the user information received from the first computing device.

15 Claims, 6 Drawing Sheets

(56) References Cited

U.S. PATENT DOCUMENTS

| | | | |
|---|---|---|---|
| 2011/0134320 A1* | 6/2011 | Daly | H04N 21/42204 348/462 |
| 2012/0157114 A1* | 6/2012 | Alameh | H04M 1/605 455/456.1 |
| 2013/0254818 A1* | 9/2013 | Gray | H04N 7/163 725/110 |
| 2013/0283162 A1* | 10/2013 | Aronsson | H04N 21/42201 715/719 |
| 2014/0100955 A1* | 4/2014 | Osotio | G06Q 30/0261 705/14.55 |
| 2015/0128161 A1* | 5/2015 | Conrad | H04N 21/44213 725/12 |
| 2015/0149902 A1 | 5/2015 | Zavesky et al. | |
| 2015/0212677 A1 | 7/2015 | Dunne et al. | |
| 2015/0237412 A1* | 8/2015 | Shimy | G11B 27/105 725/12 |
| 2016/0364397 A1* | 12/2016 | Lindner | H04N 21/44016 |
| 2017/0245023 A1* | 8/2017 | Brelis | G11B 27/00 |
| 2017/0374423 A1 | 12/2017 | Anderson | |

* cited by examiner

DYNAMIC MODIFICATION OF MEDIA CONTENT IN AN INTERNET OF THINGS (IOT) COMPUTING ENVIRONMENT

BACKGROUND OF THE INVENTION

Field of the Invention

The present invention relates in general to computing systems, and more particularly, to various embodiments for dynamically modifying media content rendered in an computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an "Internet of Things" (IoT), which is the interconnection of computing devices scattered across the globe using the existing Internet infrastructure. IoT devices may be embedded in a variety of physical devices or products.

SUMMARY OF THE INVENTION

Various embodiments for optimizing media content in an IoT environment by a processor are provided. In one embodiment, a method comprises collecting user information by a first computing device comprising an embedded IoT device associated with a user; transmitting the collected user information from the first computing device to a second computing device comprising a content-displaying IoT device; and modifying characteristics of media content rendered by the second computing device according to an analyzation of the user information received from the first computing device.

Additional system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings, such as media content related transmissions.

The generation and delivery of media content (e.g., audio/video content associated with movies, short clips, television shows, documentaries, Internet streamed video, sporting events, news broadcasts, etc.) is a large and complex industry in which users enjoy such media content using a variety of device types and in a variety of settings. Portions of this media content may include video-based advertisements. These video-based advertisements presented during the playback of the media content have increasingly been used as a form of revenue for publishers of the content. In many cases, the advertisements are distributed throughout the rendered content, with each advertisement potentially being an additional source of revenue for the publisher. Accordingly, retention of viewers during these advertisements can be critical as higher retention leads to greater viewer engagement with the content and, consequently, enhanced opportunities to show more advertisements. Further, the entity (business, school, etc.) associated with the subject of products or services presented by these advertisements have a vested interest in providing a pleasant and engaging experience to the viewer consuming the content to portray their particular product or service in an optimal way.

Advertisements presented during the delivery and consumption of the media content, however, often fail to provide such a pleasant and engaging experience to the viewer as is initially intentioned. While the reasons for the failure to provide such an experience vary greatly, some cases may include the lack of interest of the particular portrayed product or service and some cases may include aspects regarding the generated content itself relative to the propensities of the viewer. For example, in one situation the viewer might find that an advertisement is too loud with respect to audio volume, and mute the audio portion of the rendered advertisement immediately. An alternative situation may include a case where the viewer is physically located in a noisy environment during the viewing of the advertisement and is unable to discern the audio portion thereof nor the intentions of the advertisement creator. In another situation, the viewer may have physical limitations or disabilities related to their physiological or health state which encumber their perception of the advertisement. In one case, a viewer may be colorblind with regard to the blue/green domain (of which around 10% of the male population are) and the advertisement may display a majority blue/green picture. In another case, the viewer may not be wearing vision aids (e.g., glasses, contact lenses, etc.) and the advertisement may display small textual lettering of which the viewer is unable to see; and similarly, the viewer may not be wearing normally worn hearing aids and is unable to correctly hear the audio portion of the advertisement in which subtitles are not shown. Other examples may further include an advertisement displayed for an adult audience when the viewer is watching the advertisement with a child, or the color tone of the advertisement blends in too similarly with a background (e.g., of a webpage displayed in a background of the advertisement), such that the advertisement does not stand out and is difficult to view.

Each of the aforementioned examples may be problematic or leave the viewer frustrated with regard to the content displayed within the advertisement, and worse, may leave the viewer with a distaste of the entity associated with the advertisement or their portrayed product or service notwithstanding the viewer may have actually been satisfied with the content displayed thereof were such content rendered according to the viewer's particular tastes and environmental conditions. Accordingly, the mechanisms of the present invention implement such functionality as using a first IoT device to collect information regarding various limitations, states, and cognitive interests of a user (i.e., a viewer) and transmit this information to a second IoT device which automatically adjusts certain properties and characteristics of the rendered media content (i.e., advertisements) displayed thereon according to the information received from the first IoT device and an appropriateness of the media content associated therewith. In this way, the functionality considered herein provides a higher level of engagement and satisfaction to the user during the consumption of the media content while optimally portraying a more accurate intent of the producer of the media content to the user through the rendered content.

As used herein, so-called "appropriateness" of visual and audio/sound characteristic settings, such as a properties and characteristics of audio/visual content information associated with the advertisements, may be subjective and context dependent. For example, one solution for an appropriate level of visual and audio characteristic settings may be interpreted and evaluated to be either satisfactory or unsatisfactory depending on the user profile of each user. Accordingly, the so-called "appropriateness" of a particular level of visual and audio characteristic settings in content-consuming environment may depend greatly upon contextual factors, such as a user profile, environmental factors, age/maturity levels, biometric data, a health profile, emotional data, and other contextual factors. A deeper, cognitive analysis of the user and levels of the visual and audio/sound characteristic settings may be provided to further understand the user and/or interpret the appropriate level of satisfaction.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognition may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the disclosed system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Accordingly, the disclosed system may use a cognitive analysis as aforementioned to generate decisions regarding the particular adjustments to the visual and/or audio/sound characteristics of a given portion of the media content (e.g., an advertisement) rendered by the second, content-displaying computing device according to information explicitly input and/or deduced from the user by the first, embedded computing device within the context of the IoT environment. That is, information gleaned from the user by an "embedded" IoT computing device (e.g., a smart phone, smart watch, smart glasses, etc.), of which is generally more intimately associated with the user, may be provided to a "content-displaying" IoT computing device (e.g., a laptop, computer, television, tablet, etc.). A cognitive analysis of the user information may be performed on the information received from the embedded IoT computing device by the content-displaying IoT device according to influence how the media content displayed thereon should be depicted (both relative to visual/picture characteristics and audio/sound characteristics). This cognitive analysis may be used as input to machine learning operations which then "learn" user preferences and generate better decisions as to how this media content is displayed to the user during future viewings.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
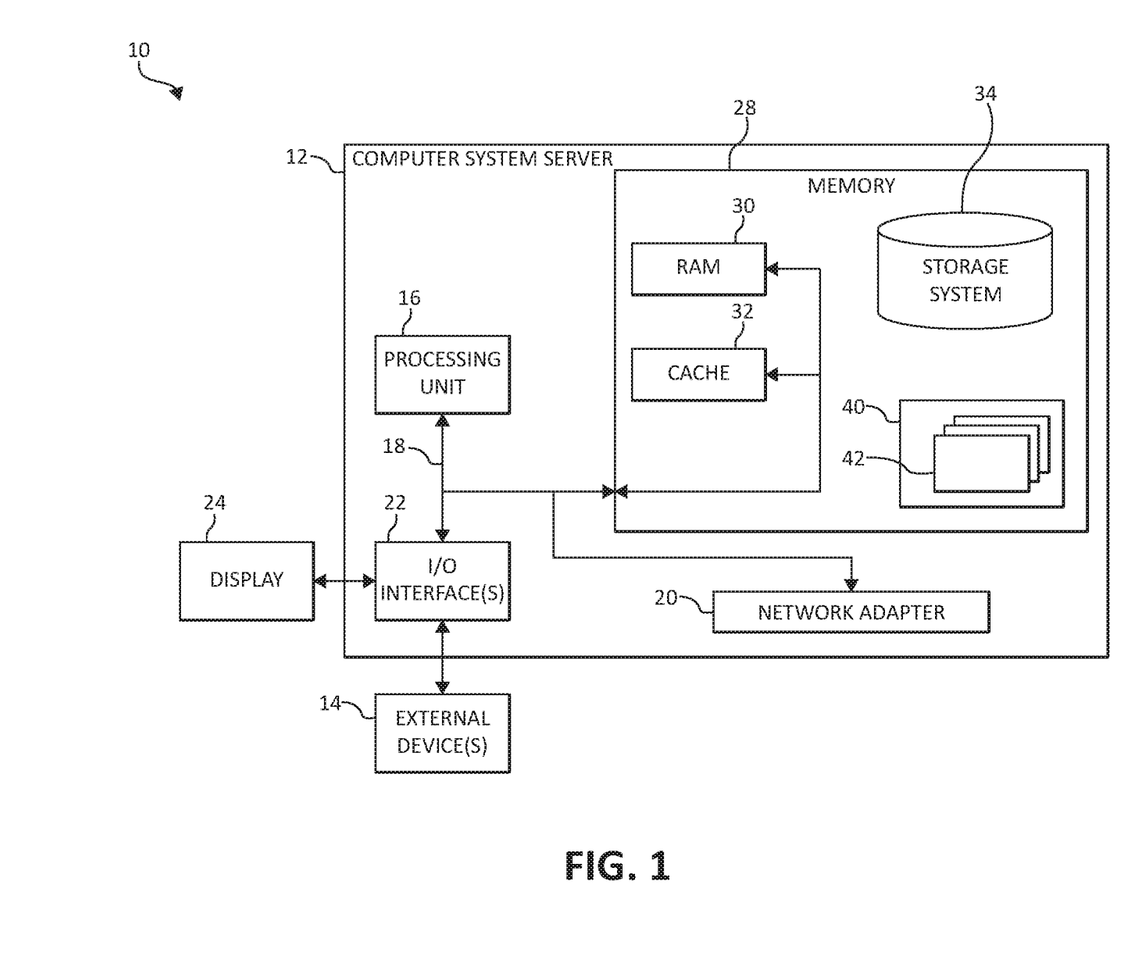
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
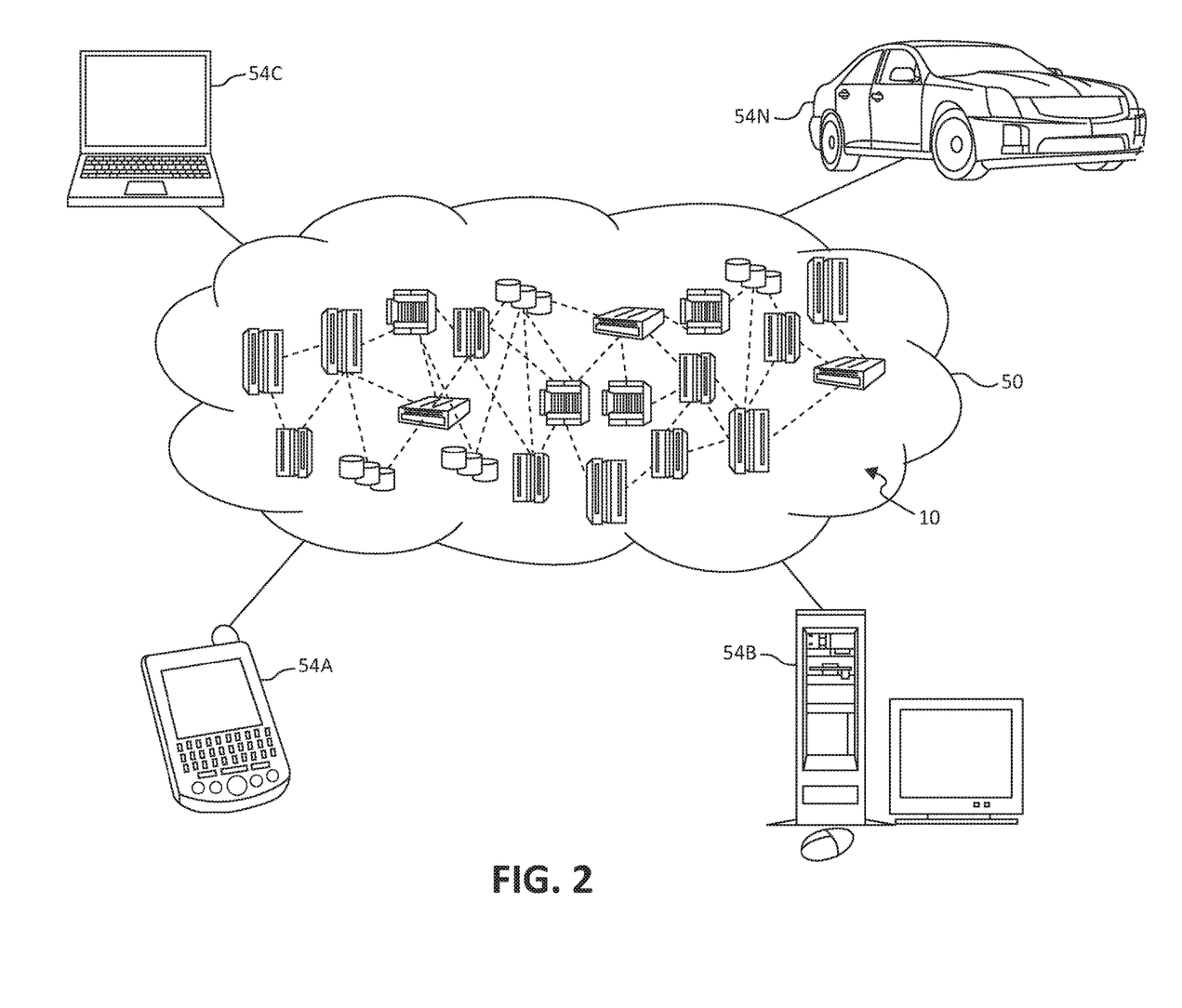
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
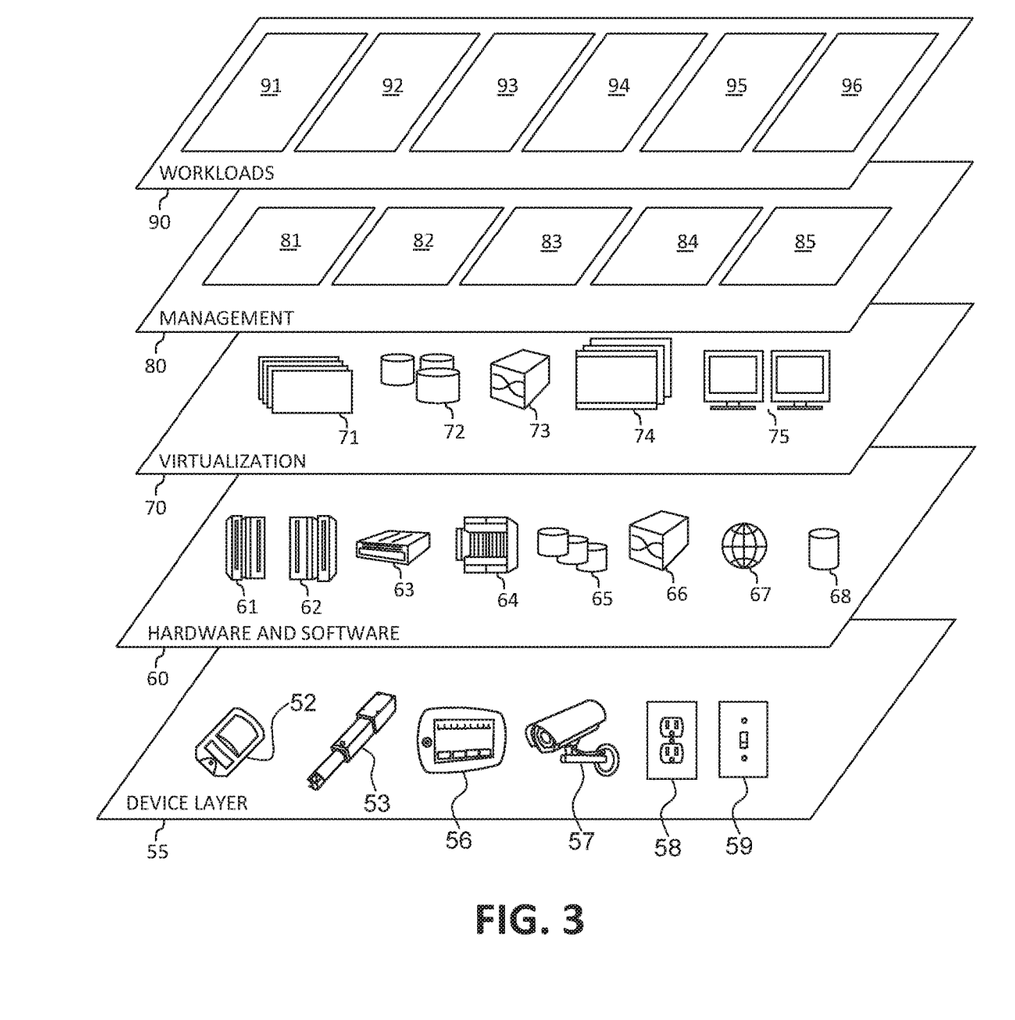
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various media content characteristic adjustment functions 96. In addition, media content characteristic adjustment functions 96 may include such operations as data analysis, machine learning (e.g., artificial intelligence, natural language processing, etc.), and user analysis as will be further described. One of ordinary skill in the art will appreciate that the media content characteristic adjustment functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Dynamic Media Content Adjustment

In one embodiment, based on the user's contextual situation, physical location and background, the color, contrast, texture, and sound characteristics (e.g., a volume or sound pressure level (SPL), tone, equalization characteristics, etc.) of the media content (i.e., the advertisement) may be changed or adjusted to most impact the user. For example, in one situation, the predominant color of the media content may be rendered such that the color and tone of the rendered advertisement is pronounced when compared to a color and tone of an underlying background or alternative media content. In other words, when viewing the advertisement on a computing web browser, for example, the rendered advertisement playing within a player within the web browser may be adjusted such that the color, contrast, tonality, and texture of the rendered content prevails or "stands out" from the other content displayed within the same window, web browser, or background. This encourages the user to engage with the media content, as the impact of various contrast levels varies from user to user. The system may cognitively decide which visual properties (e.g., contrast ratio, etc.) should be applied to the instant media content based on the user's previous interactions with the system (e.g., whether the user previously entirely viewed media content having the same visual properties, previously clicked on a link within the media content, etc.).

In another embodiment, the visual and/or audio aspects of the media content may be adjusted and rendered according to a time of day the media content is viewed by the user, or even using such measurements as current lighting conditions surrounding an environment of the user. Using a webcam or Internet Protocol (IP) camera, for example, the lighting may be monitored (e.g., whether the user is in a fully lit or dimly lit environment) to dynamically adjust the visual and audio aspects of the rendered media content. In another example, current weather conditions or a schedule of the user may be monitored from linked devices within the system to alter the media content according to the given contextual situation (e.g., modifying the media content from more visual content to display more textual content, etc.).

In another embodiment, the visual and/or audio aspects of the media content may be adjusted and rendered according to an attentiveness of the user. For example, the system may detect that the user has directed a browser displaying the media content to an alternative portion of the page (e.g., clicked away from the window displaying the media content) and dynamically modify key words (e.g., displayed text), sounds, and/or audio clips (e.g., "jingles") used in the media content to regain or attract the user's attention.

In still another embodiment, the media content rendered and displayed to the user may include a different plot or story line that may be adjusted according to the user's contextual situation. For example, if the user switches from a sports website to a news website, the remaining portion (or any subsequent advertisements or portions thereof) may be modified based on the content the user is currently engaged with to ensure the subject of the rendered media content is commensurate with the other content the user is currently viewing.

Figure 4:
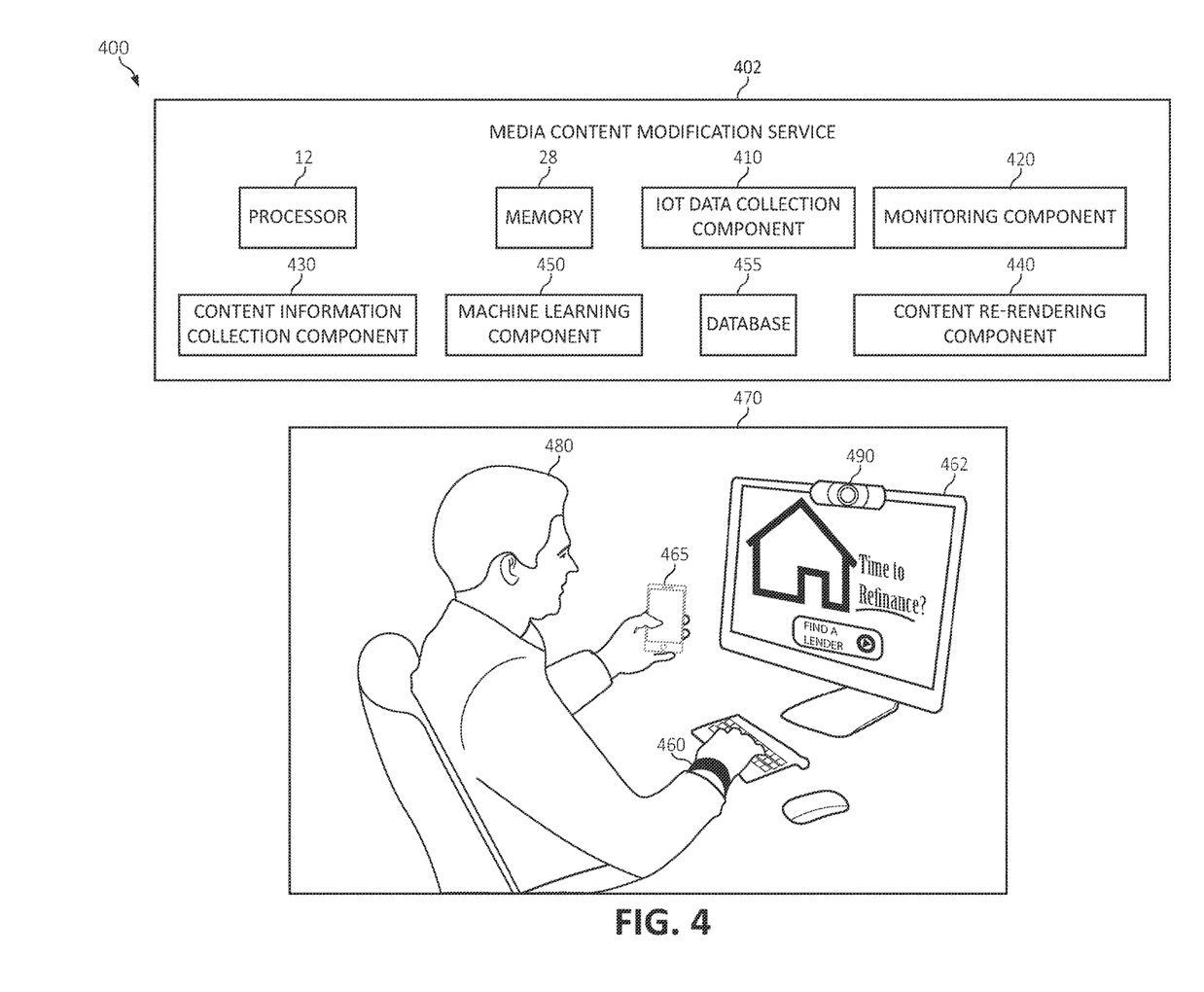
FIG. 4 is an additional block diagram depicting an exemplary functional relationship between various aspects of the present invention.

Turning now to FIG. 4, a block diagram depicting exemplary functional components 400 according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. For example, processing unit 12 and memory 28 of FIG. 1 may be employed in FIG. 4 to perform various computational, data processing, storage and other functionality in accordance with various aspects of the present invention.

The system 400 may include functional components such a media content modification service 402 (e.g., a cognitive service), having an IoT device data collection component 410, a monitoring component 420, a content information collection component 430, a content re-rendering component 440, a machine learning module 450, and a database 455, each of which may work in communication with each other.

Additionally, the media content modification service 402 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

The media content modification service 402 may be in communication with one or more IoT devices such as, for example, IoT computing device 460, 462, 465, and/or 490. In one aspect, the IoT computing device 462 may be a media display device (e.g., a television, projection screen system, computer, laptop, and/or other devices configured to display audio and/or video data on as screen) to a user 480. The IoT computing device 465 may be one or more various types of communication systems (e.g., speakers, voice-activated hubs, etc.). Moreover, IoT computing device 465 may be a smart phone and/or hand/held tablet. The IoT computing device 460 may be a wearable IoT device such as, for example, a smart watch or smart glasses.

One or more IoT computing devices such as, for example, IoT computing devices 460 and/or 465, may be used to monitor and collect a person's personal data such as, for example, data relating to one or more health state, emotional state, medical conditions, a well-being (e.g., subjective well-being "SWB", emotional well-being, mental well-being, physical well-being, or an overall well-being) of the user 480, an emotional state of the user 480, biometric data, behavior patterns, a health profile of the user 480, or a combination thereof. In one aspect, well-being may be generally described as a normal/standardized or satisfactory condition of existence of the user 480 or a state characterized by health, happiness, emotional stability, mental stability, physical stability, or success. As one of ordinary skill in the art will appreciate, "well-being" may be dependent on a number of factors, including such factors as medical condition, emotional stability, mental stability, physical stability, financial stability, a degree or level of happiness, or other factors that may be learned. A well-being of the user 480 may be defined.

The IoT computing device 460, 462, and/or 465 may comprise devices used by cloud computers, such as, for example, the PDA or cellular telephone 54A, desktop computer 54B, laptop computer 54C, and/or automobile computer system 54N as described in FIG. 2. The IoT devices (e.g., one or more of IoT computing device 460, 462, and/or 465) may also be sensor-based devices (e.g., body mounted/implanted sensors and/or a smartwatch worn by the user 480). The IoT computing devices 460, 462, 465 may also include one or more sensors that are near the user 480 or physically coupled to the user 480 and are able to measure quantities that are associated with the user 480. For example, data relating to one or more movements of the user 480, physiological measurements of the user 480, biometric measurements used to identify the user 480, environmental information for the user 480, data from equipment held by or otherwise used by the user 480, or combinations thereof may be identified, collected, and/or analyzed.

The IoT device data collection module 410 may be used to harvest, collect, and store personal data in the database 455. The IoT device data collection module 410 may parse through the collected data from one or more of the IoT devices, such as IoT devices 460, 462, 465, which may be "wearable" devices, associated with the user to identify one or more categories that includes identifying an age of the user 480, medical history, medical history of one or more persons associated with the user 480, financial conditions, status of employment, a social media user profile, social media communication patterns, favorable and unfavorable entertainment interests, food preferences, profile types and characteristics of persons associated with the user 480, an emotional state of the user 480, biometric data, behavior patterns, or a combination thereof.

The monitoring component 420 may monitor and analyze an intensity and quality of the visual and audio characteristics of displayed media content in the IoT computing environment such as, for example, the IoT device 462 (e.g., a computer). The monitoring component 420 may determine an interest of the user 480 in the displayed media content using one of more IoT computing devices 460, 462, 465.

The content information collection component 430 may monitor and analyze various informational aspects related to the media content presented to the user 480. For example, the content information collection component may collect data content information such as metadata, pertinent usage information, historical information, baseline audio/visual characteristic information, etc. associated with the rendered media content.

The content re-rendering component 440 may control visual aspects, the sound characteristics, or combination thereof of the displayed media content such as, for example, upon identifying user information for the user 480 collected from one or more of the IoT devices 460, 465, 490. Moreover, the content re-rendering component 440 may adjust the visual and audio characteristics of the rendered media content according to an attentiveness of the user by use of one or more sensory devices such as the IoT device 490 (e.g., a camera) to determine whether the user 480 is engaged with the media content as described.

The content re-rendering component 440 may also implement one or more corrective actions according to monitored behavior of the one or more users, contextual factors, the risk factor, feedback data, detected patterns of discomfort to the health state, emotional state, or combination thereof of the one or more users in relation to the displayed media content.

The machine learning component 450 may initialize a machine learning operation to monitor user feedback of the user 480 when viewing and/or interacting with the displayed media content, learn the risk factor for the one or more users and reaction to the displayed media content, recognize one or more visual patterns and sounds associated with the user 480, and/or collect feedback information of the user 480 relating to the displayed media content and the engagement thereof. Additionally, the machine learning component 450 may be initialized to learn a type of data of the user 480 to be included in the user profile, age-dependent factors and characteristics, or a combination thereof.

The machine learning module 450 may continuously and automatically receive feedback, according to applications of the media content modification service 402 for each user, from one or more IoT devices, such as IoT devices 460, 462, 465 via a communication link (e.g., wired or wireless technology including for example, but not limited to: cellular, WAN, wireless fidelity ("Wi-Fi"), Wi-Max, WLAN, Bluetooth technology, and/or combination thereof). The IoT device collection module 410 may determine whether or not the user 380 associated with the IoT devices 460, 462, 465 is reacting negatively and/or positively to both a joint analysis of both the audio/visual characteristics of one or more IoT computing devices and/or the type of content being displayed by IoT computing device 462 (e.g., a television) according to operations of the monitoring component 420.

The machine learning module 450, in conjunction with the monitoring component 420, may be used to track, monitor, and analyze feedback relating to the IoT devices, such as IoT devices 460, 462, 465 relating to the media content modification service 402. For example, the machine learning component 450 may collect, learn, and aggregate the data of the user 480 with collected data from one or more additional users. The machine learning component 450 may use one or more machine learning operations such as, for example, an instance of IBM® Watson® such as Watson® Analytics (IBM® and Watson® are trademarks of International Business Machines Corporation).

The IoT device collection module 410 and/or machine learning module 450 may include using one or more heuristics and machine learning based models for performing one or more of the various aspects as described herein. In one aspect, the IoT device compliance service and machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure.

Figure 5:
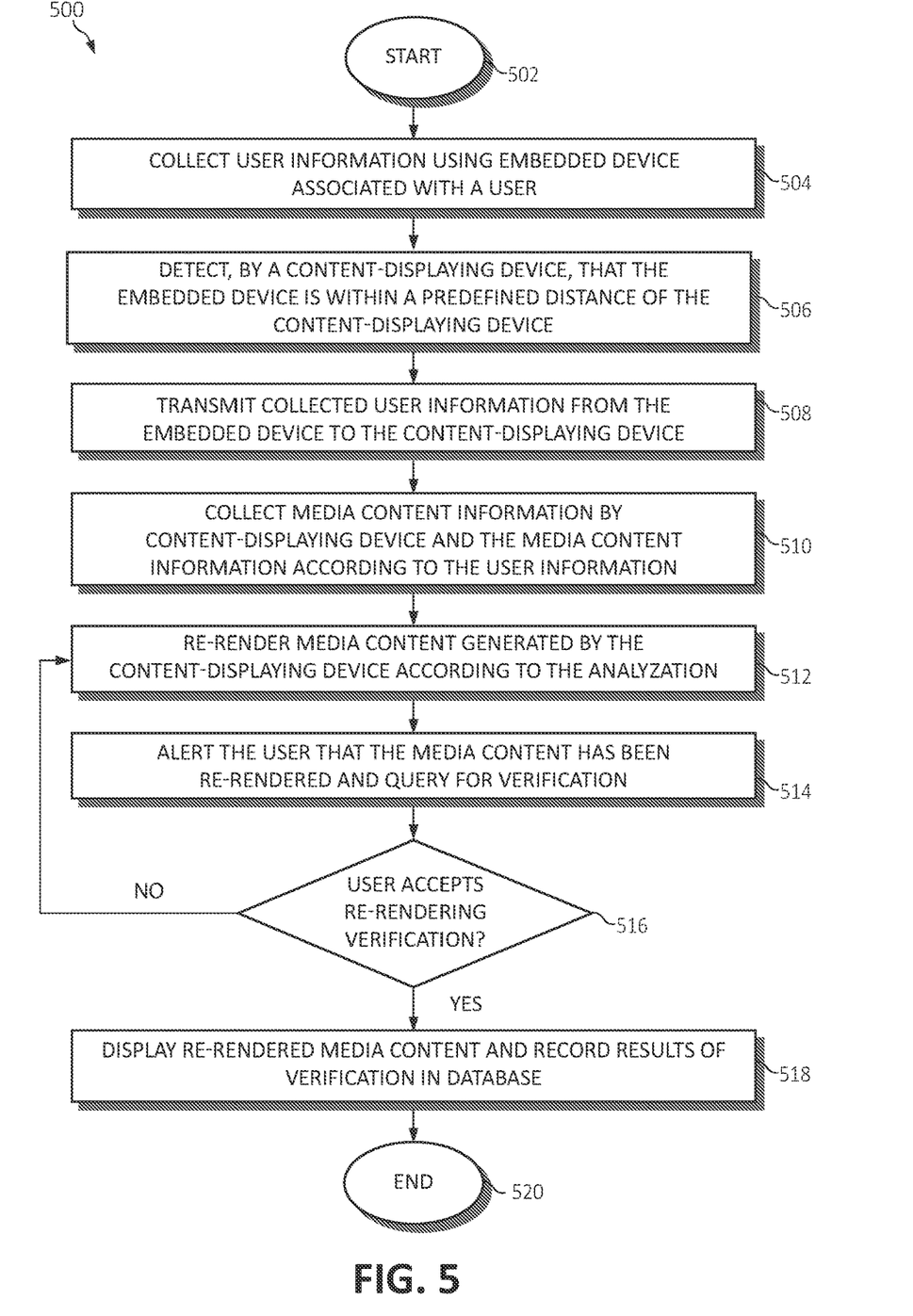
FIG. 5 is a flowchart diagram depicting an exemplary method for optimizing media content in an IoT environment according to aspects of the present invention.

Turning now to FIG. 5, a method 500 for optimizing media content in an Internet of Things (IoT) computing environment is depicted. The functionality 500 may be implemented as a method executed as instructions on a machine, where the instructions are included on a non-transitory machine-readable storage medium. The functionality 500 may start in block 502.

At step 504, user information is collected from the user 480 using an "embedded" IoT device, such as an intimate computing device associated with the user 480 (e.g., IoT devices 460 and/or 465). The user information may include biometric data, health and physiological data, location and contextual data, calendar data, cognitive and attentiveness data, and disability data associated with the user 480. For example, the user information may comprise information regarding whether the user 480 has a hearing impairment and normally wears hearing aids, or has a visual impairment and normally wears glasses or contact lenses. In another example, the user information may include contextual information associated with a current physical location of the user, personal tastes of the user gleaned from previous interactions with historical media content, social media interactions relative to a particular "theme" or product, favorite websites, favorite shows, movies and/or broadcasts, inclinations as to what services and/or products the user 480 uses or intends to user, and the like. In some implementations, the user information may comprise environmental lighting data (i.e., whether the user is in a fully lit or dimly lit environment) or weather data which may be parsed from the Internet or deduced using one of sensory-based IoT devices such as the IoT device 490 (e.g., the camera).

At step 506, a content-displaying IoT device such as IoT device 462 may detect that the embedded IoT device (e.g., IoT devices 460, 465) has entered or come within a predefined physical range of the IoT device 462 (of which range may be variable and defined according to the type of IoT device and/or an operating system thereof, etc.). Further, the IoT device 462 may detect that the user 480 is currently engaged or looking at a screen of the content-displaying IoT device 462 commensurate with detecting the embedded IoT device has entered within the predefined range.

At step 508, upon detecting that the embedded IoT device has entered within range of the content-displaying IoT device and/or that the user 480 is engaged with the display (screen) of the content-displaying IoT device, the user information may then be transmitted from the embedded IoT device to the content-displaying IoT device over a wired or wireless network (e.g., Wi-Fi, Bluetooth™, etc., not depicted). That is, one or more of the embedded IoT devices 460, 465 may transmit the collected user information associated with user 480 to the content-displaying IoT device 462. The user information is then received by the content-displaying IoT device 462 and the user information is analyzed accordingly.

In some embodiments, upon receiving the user information by the content-displaying IoT device from the embedded IoT device, a determination may be made as to whether any historical information exists for the user 480. If historical information exists for the user 480, the system may access the historical information (e.g., within the database 455) and update the information with any new information received during the instant transmission. If no historical information exists for the user 480, a new user profile may be created within the database 455 for the user 480 and the received user information may be added therein as baseline characteristics (i.e., to be added to and built upon during future transmission iterations).

At step 510, media content information associated with the media content to be displayed (i.e., the advertisement) is collected by the content-displaying IoT device during a data content collection operation. During the data content collection operation, characteristics regarding the visual and audio properties and additional information received for the media content to be displayed. The additional information may include content metadata, pertinent usage information, and historical data information associated with the media content.

At step 512, the media content is re-rendered from its original format to a modified format according to an analyzation of both the received user information and the media content information associated with the media content to be displayed. This re-rendering may comprise such steps as dynamically modifying an interface of a display associated with the content-displaying IoT device according to specific colors, tonality, contrast, lighting, texture, textual content, and/or visual content of the media content. Further, audio content, and generated sound properties associated thereof (e.g., volume, dynamic range, equalization, etc.) may be adjusted commensurate with the re-rendering. In some embodiments, the re-rendering may comprise performing a system check on the content-displaying IoT device to determine whether an operating system executing thereon includes any applicational software which optimizes visual or audio characteristics for visual and/or hearing impairments of the user 480.

At step 514, subsequent to the media content being re-rendered by the content-displaying IoT device, the user 480 may be alerted that the visual and/or audio characteristics of the rendered media content have been modified. In some embodiments, the content-displaying IoT device may then query the user 480 as a validation checkpoint (e.g., performed by the operating system executing thereon) to inquire whether the user 480 accepts the re-rendered media content. This step may include requesting the user 480 to indicate (e.g., audibly, via a tap, click, visual indication, keyboard input, etc.) that the screen and/or speakers of the content-displaying IoT device has correctly rendered the media content.

At step 516, the user 480 may then be given an option to accept or reject the re-rendered media content via a positive or negative confirmation. In some embodiments, a positive confirmation may comprise the user 480 performing no action and allowing the re-rendered media content to continue playing. In other embodiments, the positive confirmation may require a physical or virtual confirmation that the user 480 accepts the modified media content. If, at step 516, the user 480 rejects the re-rendered media content (e.g., via input into the content-displaying IoT device), the method 500 returns to re-rendering the media content using alternative visual and/or audio characteristics at step 512 and again alerts the user 480 that the media content has been re-rendered.

If, at step 516, the user accepts the re-rendered media content via a positive confirmation, the re-rendered media content is continued to be displayed by the content-displaying IoT device, and the user information analyzation, method of re-rendering of the media content, and the user's response is recorded within the database 455 to allow the learning of resulting patterns associated with each re-rendering instance. It should be noted that the database 455 is cloud-based such that the resulting patterns and processes of re-rendered media content will be available to any IoT device the user 480 uses in the future for viewing the media content. The method 500 ends (step 520).

As mentioned, the media content modification service 402 takes advantage reinforcement machine learning in order to identify personalized suitable timing for any rendered media content, and modifies the visual and audio appeal for such content. The system may consider the following parameters as input features: 1. Biometric data, health data, and mental and emotional state data. 2. Calendar data, including a predicted engagement level of any user. For instance, the calendar data may indicate that within the next day the user 480 has a client presentation, so their attentiveness level will be less towards any presented media content. Because most of the user's concentration will likely be directed toward the client presentation, ameliorative action can be taken/suggested in order to play content of user's choice (e.g., the system may play inspirational or concentration based video/audio/textual content with varying durations in order to compensate for the user's time and cognitive state). 3. User's current level of attention. For instance, if the embedded IoT device detects that guests have arrived at the user's home, the media content may be tailored to be directed toward the focus of the user and the appropriate guests rather than merely the user 480 alone.

Figure 6:
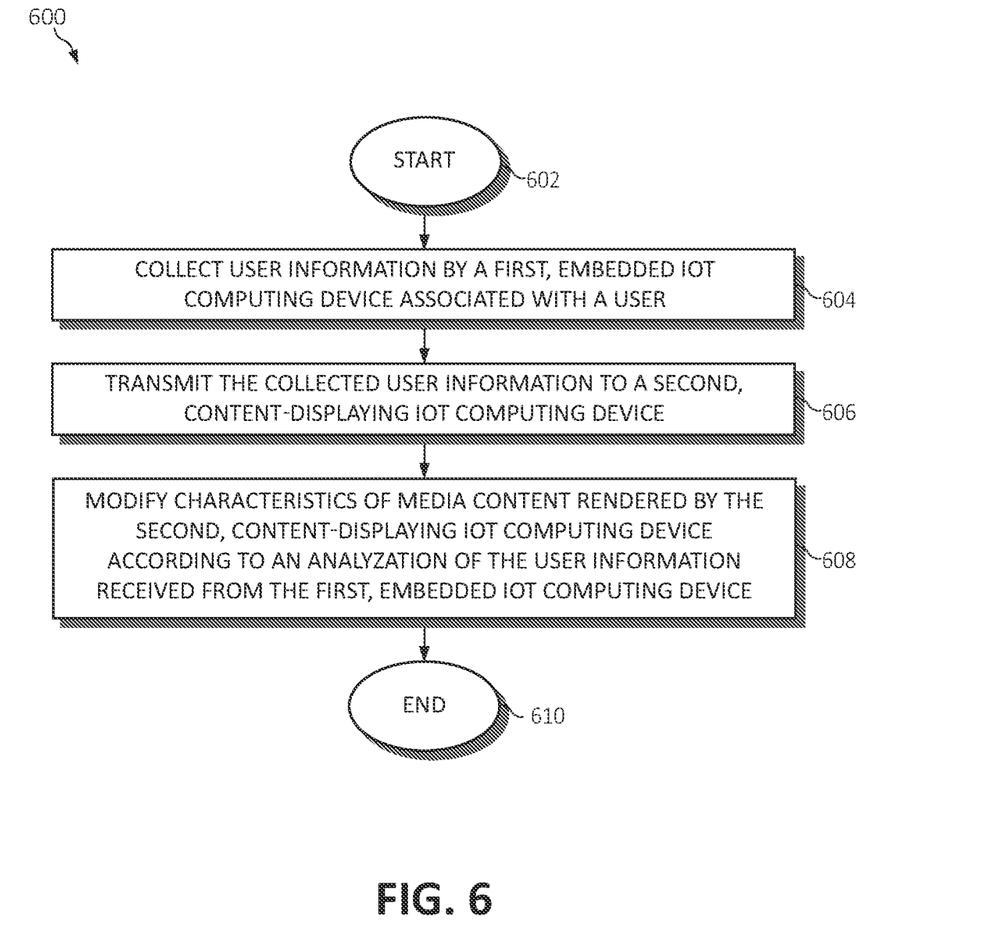
FIG. 6 is an additional flowchart diagram depicting an exemplary method for optimizing media content in an IoT environment according to aspects of the present invention.

Turning now to FIG. 6, an additional method 600 for optimizing media content in an Internet of Things (IoT) computing environment is depicted. The functionality 600 may be implemented as a method executed as instructions on a machine, where the instructions are included on a non-transitory machine-readable storage medium. The functionality 600 may start in block 602.

At step 604, user information is collected by a first, embedded IoT computing device associated with a user. At step 606, the collected user information is transmitted from the first computing device to a second, content-displaying IoT computing device. At step 608, characteristics of media content rendered by the second computing device are then rendered according to an analyzation of the user information received from the first computing device. The method 600 ends (step 610).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for optimizing media content in an Internet of Things (IoT) environment, by a processor, comprising:
collecting user information by a first computing device comprising an embedded IoT device associated with a user; wherein the user information comprises at least health and physiological data of the user as the health and physiological data relate to media content consumed by the user, and location and contextual data of situational characteristics of the location of the user;
transmitting the collected user information from the first computing device to a second computing device comprising a content-displaying IoT device;

modifying characteristics of the media content rendered by the second computing device according to an analyzation of the user information received from the first computing device;

re-rendering the media content having the modified characteristics by the second computing device notwithstanding a substance of content of the re-rendered media content remains unchanged and;

alerting the user to perform a verification of the re-rendered media content wherein the verification includes a validation checkpoint presented by the second computing device requesting the user to select a positive confirmation response or a negative confirmation response; wherein when the negative confirmation response is selected by the user, an additional re-rendering of the media content is performed using alternatively modified characteristics.

2. The method of claim 1, wherein the characteristics are selected from a group consisting of color, tonality, contrast, lighting, texture, textual content, visual content, audio content, and generated sound properties associated with the audio content.

3. The method of claim 1, further including detecting, by the second computing device, that the first computing device has physically entered within a predefined range of the second computing device; wherein the transmitting of the collected user information from the first computing device to the second computing device is performed commensurately with the detecting.

4. The method of claim 1, further including, prior to rendering the media content, performing a data content collection operation on the media content by the second computing device; wherein the data content collection operation includes collecting at least content metadata, pertinent usage information, and historical data information associated with the media content.

5. The method of claim 1, wherein the user information is further selected from a group consisting of biometric data, calendar data, cognitive and attentiveness data, and disability data associated with the user.

6. A system for optimizing media content in an Internet of Things (IoT) environment, comprising:
a first computing device; and
a second computing device; wherein the first computing device and the second computing device include executable instructions that when executed cause the system to:
collect user information by the first computing device comprising an embedded IoT device associated with a user; wherein the user information comprises at least health and physiological data of the user as the health and physiological data relate to media content consumed by the user, and location and contextual data of situational characteristics of the location of the user;
transmit the collected user information from the first computing device to the second computing device comprising a content-displaying IoT device;
modify characteristics of the media content rendered by the second computing device according to an analyzation of the user information received from the first computing device;
re-render the media content having the modified characteristics by the second computing device notwithstanding a substance of content of the re-rendered media content remains unchanged and;
alert the user to perform a verification of the re-rendered media content wherein the verification includes a validation checkpoint presented by the second computing device requesting the user to select a positive confirmation response or a negative confirmation response; wherein when the negative confirmation response is selected by the user, an additional re-rendering of the media content is performed using alternatively modified characteristics.

7. The system of claim 6, wherein the characteristics are selected from a group consisting of color, tonality, contrast, lighting, texture, textual content, visual content, audio content, and generated sound properties associated with the audio content.

8. The system of claim 6, wherein the executable instructions further detect, by the second computing device, that the first computing device has physically entered within a predefined range of the second computing device; wherein the transmitting of the collected user information from the first computing device to the second computing device is performed commensurately with the detecting.

9. The system of claim 6, wherein the executable instructions further, prior to rendering the media content, perform a data content collection operation on the media content by the second computing device; wherein the data content collection operation includes collecting at least content metadata, pertinent usage information, and historical data information associated with the media content.

10. The system of claim 6, wherein the user information is further selected from a group consisting of biometric data, calendar data, cognitive and attentiveness data, and disability data associated with the user.

11. A computer program product for optimizing media content in an Internet of Things (IoT) environment, by a processor, the computer program product embodied on a non-transitory computer-readable storage medium having computer-readable program code portions stored therein, the computer-readable program code portions comprising:
an executable portion that collects user information by a first computing device comprising an embedded IoT device associated with a user; wherein the user information comprises at least health and physiological data of the user as the health and physiological data relate to media content consumed by the user, and location and contextual data of situational characteristics of the location of the user;
an executable portion that transmits the collected user information from the first computing device to a second computing device comprising a content-displaying IoT device;
an executable portion that modifies characteristics of the media content rendered by the second computing device according to an analyzation of the user information received from the first computing device;
an executable portion that re-renders the media content having the modified characteristics by the second computing device notwithstanding a substance of content of the re-rendered media content remains unchanged and;
an executable portion that alerts the user to perform a verification of the re-rendered media content; wherein the verification includes a validation checkpoint presented by the second computing device requesting the user to select a positive confirmation response or a negative confirmation response; wherein when the negative confirmation response is selected by the user, an additional re-rendering of the media content is performed using alternatively modified characteristics.

12. The computer program product of claim 11, wherein the characteristics are selected from a group consisting of color, tonality, contrast, lighting, texture, textual content, visual content, audio content, and generated sound properties associated with the audio content.

13. The computer program product of claim 11, further including an executable portion that detects, by the second computing device, that the first computing device has physically entered within a predefined range of the second computing device; wherein the transmitting of the collected user information from the first computing device to the second computing device is performed commensurately with the detecting.

14. The computer program product of claim 11, further including an executable portion that, prior to rendering the media content, performs a data content collection operation on the media content by the second computing device; wherein the data content collection operation includes collecting at least content metadata, pertinent usage information, and historical data information associated with the media content.

15. The computer program product of claim 11, wherein the user information is further selected from a group consisting of biometric data, calendar data, cognitive and attentiveness data, and disability data associated with the user.

* * * * *